United States Patent
Joaquim Antunes Quevedo et al.

(10) Patent No.: US 12,427,697 B2
(45) Date of Patent: Sep. 30, 2025

(54) PROCESS FOR RECYCLING LAMINATED POLYMER PACKAGING COMPRISING ALUMINIUM

(71) Applicants: Edson Joaquim Antunes Quevedo, Barueri (BR); Henrique Silva De Araujo, Valinhos (BR)

(72) Inventors: Edson Joaquim Antunes Quevedo, Barueri (BR); Henrique Silva De Araujo, Valinhos (BR)

(*) Notice: Subject to any disclaimer, the term of this patent is extended or adjusted under 35 U.S.C. 154(b) by 667 days.

(21) Appl. No.: 17/785,157

(22) PCT Filed: Nov. 20, 2020

(86) PCT No.: PCT/BR2020/050493
§ 371 (c)(1),
(2) Date: Jun. 14, 2022

(87) PCT Pub. No.: WO2021/119775
PCT Pub. Date: Jun. 24, 2021

(65) Prior Publication Data
US 2023/0036469 A1    Feb. 2, 2023

(30) Foreign Application Priority Data
Dec. 19, 2019  (BR) .................... 102019027311-9

(51) Int. Cl.
| C08J 11/06 | (2006.01) |
| B29B 17/02 | (2006.01) |
| B29B 17/04 | (2006.01) |
| B29K 105/26 | (2006.01) |
| B29K 705/02 | (2006.01) |

(52) U.S. Cl.
CPC .............. *B29B 17/02* (2013.01); *B29B 17/04* (2013.01); *C08J 11/06* (2013.01); *B29B 2017/0286* (2013.01); *B29B 2017/0296* (2013.01); *B29B 2017/0448* (2013.01); *B29K 2105/26* (2013.01); *B29K 2705/02* (2013.01); *C08J 2323/06* (2013.01); *C08J 2323/12* (2013.01); *C08J 2367/02* (2013.01); *C08J 2423/06* (2013.01); *C08J 2423/12* (2013.01); *C08J 2467/02* (2013.01)

(58) Field of Classification Search
USPC .......................................................... 521/47
See application file for complete search history.

(56) References Cited

U.S. PATENT DOCUMENTS

| 2004/0129372 A1 | 7/2004 | Huang et al. |
| 2006/0267228 A1 | 11/2006 | Antunes |

FOREIGN PATENT DOCUMENTS

| BR | PI0706115-3 A2 | 6/2009 | |
| EP | 1683829 A1 | 7/2006 | |
| EP | 1683829 B1 * | 8/2009 | ............. B29B 17/02 |
| FR | 2711079 A1 | 4/1995 | |
| WO | 2016176752 A1 | 11/2016 | |
| WO | 2020/132733 A1 | 7/2020 | |

OTHER PUBLICATIONS

PCT Search Report for International Application No. PCT/BR2020/050493, mailed Feb. 13, 2021, 3 pp.
English translation for PCT Search Report for International Application No. PCT/BR2020/050493, mailed Feb. 13, 2021, 2 pp.
Written Opinion for International Application No. PCT/BR2020/050493, mailed Feb. 13, 2021, 4 pp.

* cited by examiner

*Primary Examiner* — Terressa Boykin
(74) *Attorney, Agent, or Firm* — The Roy Gross Law Firm, LLC; Roy D. Gross

(57) ABSTRACT

"PROCESS FOR RECYCLING LAMINATED POLYMER PACKAGING COMPRISING ALUMINIUM" contained in the application field of recycling processes, more precisely in the field of recycling processes for laminate polymeric packaging. Said process comprises stages of crushing and preliminary washing of laminate polymeric packages comprising aluminum, selective aluminum dissolution reaction, cleaning and drying, obtaining recycled fragments. The recycling process showed in the invention stands out from its similar by using the process of selective dissolution of laminate polymeric packaging comprising aluminum complemented by a combination of process parameters and steps that aim to accelerate and optimize the dissolution process and guarantee the purity and yield of the products obtained according to the process described herein.

20 Claims, No Drawings

PROCESS FOR RECYCLING LAMINATED POLYMER PACKAGING COMPRISING ALUMINIUM

This application is a National Phase of PCT Patent Application No. PCT/BR2020/050493 having International filing date of Nov. 20, 2020, which claims the benefit of priority of Brazilian Patent Application No. BR 102019027311-9, filed Dec. 19, 2019, the contents of which are all incorporated herein by reference in their entirety.

APPLICATION FIELD

The present invention refers to the application field of recycling processes, more precisely to the field of recycling processes for laminate polymeric packaging.

The recycling process showed in the invention stands out from its similar using the process of selective dissolution of laminate polymeric packaging comprising aluminum complemented by a combination of process parameters and steps aiming to accelerate and optimize the dissolution process and assure the purity and yield of the products obtained according to the process described herein.

DESCRIPTION OF THE PRIOR ART

Due to the globalization process, the use of natural resources has intensified and, as a consequence, the increase in environmental degradation. In this context, it has become important to develop technologies to reduce said environmental liability, inserting processes and devices for recycling products as one of the ecologically effective alternatives. Due to the different physical and chemical properties of the products of interest, the development of new recycling processes has challenges in terms of efficiency and waste generation, making it important to adapt the process for each type of material to be recycled.

Among the processes currently employed, those applied for recycling laminate polymeric packages comprising aluminum, that is, packages comprising a plurality of polymeric layers such as polyethylene, polypropylene and polyethylene terephthalate and aluminum among said polymeric materials, stand out. In this case, it is necessary to develop processes comprising steps of aluminum selective dissolution, which restricts the methods not having means to eliminate the aforementioned metallic materials, especially those not using alkaline compounds for the selective dissolution.

Consequently, several existing technologies do not work in the context of recycling polymeric packaging comprising aluminum and the techniques fitting the profile of the recyclable product are not efficient. In addition, currently existing recycling processes also have challenges in the context of gravitational separation of polymeric materials since its densities and thicknesses vary according to the physical chemical properties of each polymer type. Additionally, the recycling processes of laminate polymeric packaging comprising aluminum are too time-consuming, reducing industrial productivity, and have low efficiency in obtaining the recycled product. For better contextualization and understanding of the main existing problems, the prior art technologies will be described below.

Document FR2711079A1 discloses a method of recycling plastics in order to obtain thin polymeric blocks. In this context, the plastic to be recycled is dissolved in a solvent to form a paste with high viscosity, and then heated through an ultrasonic wave transmitter device. The generated bubbles are removed from the system by applying a pressure of 10 Bar by a press. The technology described in this prior art document is not applicable to the recycling of laminate polymeric packaging comprising aluminum because it has a melting step and uses solvents that increase the viscosity of plastics. These process steps favor obtaining a paste comprising a mixture of plastics, not being efficient in separating them according to its density. The method described does not even have a polymer separation step, regardless of its physical and/or chemical properties. Additionally, this prior art document does not propose a set of process parameters and complementary steps favoring the reduction of process time and increase in efficiency/purity, and also does not comprise means for the selective dissolution of metals such as aluminum, an important aspect for the recycling of laminate polymeric packaging comprising aluminum.

Document P10706115-3 describes a method of recycling multilayer packaging comprising plastic materials and aluminum, which comprises steps of immersing multilayer packaging in a NaOH-based alkaline solution, separating, removing and treating the plastic layers, selective dissolution of aluminum into metal ions, precipitation of the latter and filtration. The removal of plastic layers is described as being performed manually and with no use of devices to increase effectiveness, compromising its efficiency and increasing the process time. This technology, still, does not present technical solutions that allow the separation of a mixture of different polymers.

Document WO2016176752A1 discloses a process for recycling plastic packaging comprising aluminum, comprising a shredding step to form chopped sheets. The latter are subjected to a chemical separation step using formic acid in order to segregate the plastic sheets from the metal sheets. The separated materials are washed, and the aluminum oxide present in paper fibers obtained in the process is incinerated. The technology described in this prior art document also does not use a set of process parameters and combined steps that favor the rapid and efficient aluminum selective dissolution and high purity in the final recycled products. This document also does not disclose a selective dissolution process for aluminum which, in this case, is removed through incineration. In this way, the separation efficiency is lower when compared to technologies that use a combination of process parameters and steps that accelerate and optimize the selective dissolution of aluminum and aiming at high yield and purity in the final recycled products.

Document US2006267228 refers to a reuse process of plastic materials and rejected papers in recycling and its resulting product. More specifically, said process comprises steps of preliminary preparation of said recyclable materials, grinding, washing, drying and processing. The technology described in this American document uses conventional steps of recycling processes without, however, comprising a step of selective dissolution of metals. Consequently, said process is not functional for recycling laminate polymeric packages comprising aluminum. Additionally, document US2006267228 does not propose the use of process parameters and combined steps that favor process time reduction and efficiency increase.

Thus, the prior art technologies refer to processes and methods of recycling laminate (polymeric) plastic materials comprising aluminum through polymer-metal separation techniques. As such, chemical routes are known, such as selective dissolution using alkaline solutions or the addition of chemical substances that favor the segregation of the polymer in relation to the aluminum layer. These routes are too time-consuming and have low efficiency in recycling laminate polymer packaging comprising aluminum. Thus, no technologies were found that use a combination of process parameters and steps in order to favor, in less time and greater efficiency, the selective dissolution of aluminum and the effective recycling of the products involved. In addition, the way they are conceived, the existing technologies also do not have steps that favor the effective cleaning of materials submitted to recycling, affecting their purity and yield.

SUMMARY OF THE INVENTION

The present invention aims to provide a recycling process for laminate polymeric packaging comprising aluminum. The said process has as a differential a fast and efficient step of aluminum selective dissolution present between the polymeric layers. The brevity and efficiency of this step is due to the combination of process parameters and complementary steps that, when combined, favor the said result. In this context, parameters such as temperature adjustment and steps comprising the application of a volume limiting screen and the application of ultrasound significantly accelerate and optimize the selective aluminum dissolution step when combined with each other and with the other parameters and steps of the process, being essential for purposes of the present invention. Said step, being efficient due to this combination of process parameters and complementary steps, favors, together with the steps of mechanical disaggregation, gravitational separation and pelletizing, final products with greater purity and yield, being also essential for the purposes of the present invention.

BRIEF DESCRIPTION OF THE INVENTION

The present invention relates to a PROCESS FOR RECYCLING LAMINATED POLYMER PACKAGING COMPRISING ALUMINIUM, said packages comprising a plurality of polymeric layers comprising polyethylene, polypropylene and, optionally, polyethylene terephthalate, regardless of the amount or combination thereof. Said process comprises the following steps: grinding and preliminary washing of laminate polymeric packages comprising aluminum, forming grinded laminate polymeric packages; transferring the grinded laminate polymeric packages to a reactor; application of a volume limiting screen in the reactor; immersing said grinded laminate polymeric packages in an aqueous alkaline solution, forming a first solution; temperature adjustment of the first solution; reaction of aluminum selective dissolution in the first solution, forming a second solution comprising fragments of polyethylene, polypropylene and, when applicable, polyethylene terephthalate; draining the second solution from the reactor, so that the fragments are retained at the bottom of the reactor; removing fragments from the reactor and cleaning said fragments; mechanical disaggregation of the fragments, forming disaggregated fragments; decontamination of the disaggregated fragments, obtaining clean fragments based on polyethylene, polypropylene and, when applicable, polyethylene terephthalate; transferring said clean fragments to a water tank for gravity separation, when said clean fragments comprise polyethylene terephthalate; or transferring said clean fragments directly to the drying step, when said clean fragments do not comprise polyethylene terephthalate; gravitational separation of the cleaned fragments comprising polyethylene, polypropylene and polyethylene terephthalate, at the water tank; obtaining polyethylene and polypropylene fragments in the supernatant and polyethylene terephthalate at the bottom of the tank; removing and obtaining clean polyethylene and polypropylene fragments; removing and obtaining clean polyethylene terephthalate fragments; transferring the cleaned polyethylene and polypropylene fragments to the drying stage; and transferring the cleaned polyethylene terephthalate fragments to the drying step; drying the clean fragments obtained according to the gravitational separation stage or according to the decontamination stage when said clean fragments do not comprise polyethylene terephthalate, obtaining recycled fragments of polyethylene, polypropylene and, when applicable, polyethylene terephthalate.

BRIEF DESCRIPTION OF THE DRAWINGS

The subject matter of this Invention will be fully evident in its technical aspects from the detailed description that will be given below.

DETAILED DESCRIPTION OF THE INVENTION

In accordance with the objectives showed through brief description, the present patent application PROCESS FOR RECYCLING LAMINATED POLYMER PACKAGING COMPRISING ALUMINIUM shows a process aimed at recycling laminate polymeric packaging comprising aluminum and a plurality of polymeric layers comprising polyethylene, polypropylene and, optionally, polyethylene terephthalate, irrespective of the amount or combination thereof. Said aluminum, according to the present invention, is as an aluminum-based metallization layer (m) or as an aluminum foil (ALU). For the purposes of the present invention, the "aluminum-based metallization layer" is meant to be that formed from deposition processes on the polymeric layers comprised in said packages. Additionally, "aluminum foil" is meant to be a pure aluminum foil laminate together with said polymeric layers.

In this process, aluminum is separated through a chemical reaction, while polyethylene (PE), polypropylene (PP, OPP or BOPP) and polyethylene terephthalate (PET) (when present) are separated by physical processes. In detail, aluminum is chemically separated through its complete selective dissolution, which takes place through a reaction with an aqueous alkaline solution. Said polypropylene is selected from the group comprising oriented polypropylene (OPP), biaxially oriented polypropylene (BOPP) and polypropylene (PP); however, not being limited to these types of polypropylene.

The "PROCESS FOR RECYCLING LAMINATED POLYMER PACKAGING COMPRISING ALUMINIUM" comprises the following steps:

(a) grinding and preliminary washing of the laminate polymeric packages comprising aluminum, forming grinded laminate polymeric packages;
(b) transferring the grinded laminate polymeric packages to a reactor;
(c) applying a volume limiting screen to the reactor;
(d) optionally, applying a vacuum to the reactor;
(e) immersing said grinded laminate polymeric packages in an aqueous alkaline solution, forming a first solution;
(f) optionally, stirring the first solution;
(g) optionally applying ultrasound to the first solution;
(h) temperature adjustment of the first solution;
(i) selective dissolution reaction of aluminum in the first solution, forming a second solution comprising fragments of polyethylene, polypropylene and, where applicable, polyethylene terephthalate;

(j) draining the second solution of the reactor, so that the fragments from step (i) are retained at the bottom of the reactor;

(k) removing the fragments from the reactor and cleaning said fragments;

(l) mechanical disaggregation of the fragments from step (k), forming disaggregated fragments;

(m) decontamination of the disaggregated fragments, obtaining clean fragments based on polyethylene, polypropylene and, when applicable, polyethylene terephthalate; and transferring said clean fragments into a water tank for gravitational separation in subsequent step (n), when said clean fragments comprise polyethylene terephthalate; or transferring said cleaned fragments directly to the subsequent step (o), when said cleaned fragments do not comprise polyethylene terephthalate;

(n) gravitational separation of the cleaned fragments comprising polyethylene, polypropylene and polyethylene terephthalate at the water tank; obtaining polyethylene and polypropylene fragments in the supernatant and polyethylene terephthalate at the bottom of the tank; removing and obtaining clean polyethylene and polypropylene fragments; removing and obtaining clean polyethylene terephthalate fragments; transferring the cleaned polyethylene and polypropylene fragments to the subsequent step (o); and transferring the cleaned polyethylene terephthalate fragments to the subsequent step (o);

(o) drying the clean fragments obtained according to step (m) or according to step (n), obtaining recycled fragments of polyethylene, polypropylene and, when applicable, polyethylene terephthalate; and (p) optionally, pelletizing said recycled fragments.

Said laminate polymeric packages mentioned in step (a) are present in amounts up to 80% reactor volumetric capacity. For each possible Kg of laminate polymeric packaging involved in step (a), the amount of aluminum comprises the range between 0.01% and up to 40% (mass/mass). Step (a) for grinding and washing is performed through devices selected from the group comprising chippers, crushers, cutting mills, rotary mills and plastic sprayers, however not being limited to these types of devices. The laminate polymeric packages involved in step (a) can be wet or dry grinded. After being grinded and washed as described, the laminate polymeric packages comprising aluminum are made into grinded laminate polymeric packages, the latter being preferred for purposes of the present invention. Additionally, grinded laminate polymeric packages can comprise particles and/or fragments in any shape and have dimensions between 50 microns and 5 cm. However, it is important to mention that the process described herein is not limited to grinded laminate polymeric packages only but may involve non-grinded laminate polymeric packages that are washed according to step (a). In this context, the yield of the process described herein will be higher for grinded laminate polymeric packages when compared to non-grinded laminate polymeric packages. Laminate polymeric packages comprising aluminum, grinded or not, can come from industrial or post-consumer disposal packages. In the case of post-consumer packaging, the washing step is more relevant for the removal of food, fats and various organic materials residues that are eventually adhered to the surfaces.

After being grinded and washed according to step (a), the grinded laminate polymeric packages are transferred to the reactor, as described in step (b) of the process described herein, object of the present invention. In this context, the grinded laminate polymeric packages are added in up to 80% maximum volume of said reactor, so that there is a remaining volume of at least 20% maximum volume of said reactor, for the release of gases generated in the selective dissolution step of aluminum and for locking the volume limiting screen, better described below.

In step (c), after the reactor is filled with said grinded laminate polymeric packages, a volume limiting screen is positioned in the reactor upper portion, that is, above the volume filled by the grinded laminate polymeric packages. During the positioning of said screen, it is locked in order to prevent the overflow of the reactor's internal contents to the external environment. In some of the numerous embodiments of the present invention, the volume limiting screen comprises a perforated plate, a metal screen or a plastic screen. One of the main advantages of the presence of said screen in the reactor is the fact of keeping the grinded laminate polymeric packages immersed in the aqueous alkaline solution during the aluminum selective dissolution step described below. This is because during the separation of the polymeric layers present in the grinded laminate polymeric packages, the volume of said packages increases. Furthermore, the formation of gases during the aluminum selective dissolution step pushes the grinded laminate polymeric packages out of the reactor, as they are light and do not come off easily. Consequently, there would be a non-immersed volume of said packages, significantly affecting the time and efficiency of said dissolution, since the non-immersed portions (out of solution) of said packages do not participate in the reaction involved in the aluminum selective dissolution step. It is important to emphasize that, in the absence of a volume limiting screen, the grinded laminate polymeric packages remain suspended on the solution surface contained in the reactor, acting as if they were a buoy, hence the need to apply said screen. Furthermore, applying stirring is not always sufficient to prevent said overflow, therefore, the presence of the volume limiting screen is necessary in order to keep the grinded laminate polymeric packages immersed. Additionally, besides maintaining the immersion of said packages, said screen also allows the passage of generated gases, as it comprises openings whose sizes vary up to 0.1 cm. In another non-restrictive embodiment of the present invention, said screen comprises openings which sizes vary up to 250 microns, especially for grinded laminate polymeric packages that have been previously grinded through plastic spraying devices. Thus, the overflow of said packages is avoided and the gases generated pass through said openings, being released to the external environment or reused. In view of the description of the step of applying the volume limiting screen, this consists of one of the steps that contributes, in combination with the process parameters and steps described below, to the differential of the invention in the context of accelerating and optimizing the step of aluminum dissolution.

Step (d) is optional for the purposes of the present invention and consists of applying a vacuum to the reactor in order to suction of bubbles and gases generated in the selective aluminum dissolution step described below. The vacuum pressure comprises values between 100 and 630 mmHg, preferably between 400 and 500 mmHg. Said gases generated in the aluminum selective dissolution step comprise combustible properties, that is, they are of industrial and commercial interest. In this context, the applied vacuum recovers said gases, which are later stored and transported. Said gases preferably comprise hydrogen gas. The vacuum applied in step (d) is cooperating with the application of ultrasound described below, as it also helps to increase the exhaust velocity of the gases generated in the aluminum selective dissolution reaction. This cooperation speeds up the process and increases its efficiency. Additionally, applying vacuum at this stage of the process comprises three main advantages: it minimizes the risk of inhaling asphyxiating gases such as hydrogen, preventing fatal accidents; minimizes the risk of fire during the formation of gases in the aluminum selective dissolution step, especially when said gases comprise hydrogen, a combustible gas; and accelerates the de-gassing process, accelerating said selective dissolution step. If the reactor consists of an open system or is not capable of working under vacuum, one of the embodiments of the present invention comprises the application of exhaust instead of applying vacuum, also allowing the suction of the generated gases.

In step (e), the aqueous alkaline solution is added to the reactor comprising the grinded laminate polymeric packages. The addition is performed through pumping, pressure differential (vacuum) or gravity up to the level of the volume limiting screen, completing up to 90 to 100% total reactor volume, in order to assure the complete immersion of the grinded laminate polymeric packages. From a volumetric point of view, the reactor has a volume between 100 L and 50,000 L, preferably between 2000 L and 35,000 L. The aqueous alkaline solution comprises a strong base in concentrations between 1 and 50% (by mass/volume), preferably between 2.0 and 12.5% (by mass/volume). The strong base, in turn, is selected from the group comprising alkali-metal hydroxides and alkaline-earth metal hydroxides, preferably alkali-metal hydroxides, however not being limited to these types of hydroxides. The alkali-metal hydroxides, in turn, are selected from the group comprising lithium hydroxide (LiOH), sodium hydroxide (NaOH) and potassium hydroxide (KOH), preferably sodium hydroxide (NaOH), however not limited to these types of alkali metal hydroxides. In the case of alkaline-earth metal hydroxides, these are selected from the group comprising calcium hydroxide $Ca(OH)_2$, magnesium hydroxide $Mg(OH)_2$ and barium hydroxide $Ba(OH)_2$, preferably calcium hydroxide, however not being limited to these types of alkaline-earth metal hydroxides. From a stoichiometric point of view, for each kg of aluminum present in step (e), the amount of strong base comprises the range between 1.0 and 5.0 kg, preferably between 1.5 and 3.0 kg. Once the aqueous alkaline solution is added, a first solution is formed inside the reactor, comprising said aqueous alkaline solution and the grinded laminate polymeric packages.

Step (f) is optional for the purposes of the present invention and consists of stirring the first solution in a rotation range comprising the range between 10 and 500 RPM, preferably between 100 and 300 RPM. Considering that the process described herein, object of the present invention, comprises a subsequent mechanical disaggregation step, the use of agitation in this step is not mandatory. However, agitation is recommended, since it also provides a preliminary mechanical disaggregation of the grinded laminate polymeric packages, an increase in the homogeneity of the first solution, considered heterogeneous because it comprises a liquid phase (aqueous alkaline solution) and a solid phase (grinded laminate polymeric packages), a reduction in process time and, above all, an increase in the purity of the final product. The use of stirring also eliminates possible gas bubbles formed on the surface of the grinded laminate polymeric packages, allowing the complete and effective separation of the polymeric layers present in the grinded laminate polymeric packages, which also favors the high quality and purity of the final product.

Step (g) is also optional for the purposes of the present invention and consists of applying ultrasound to the first solution. More specifically, ultrasound refers to the application of sound waves that transmit energy to the first solution, being performed through a sonicator present in said reactor, with the objective of accelerating the movement and collision of the molecules of the first solution and releasing gases generated in this step, reducing the process time. In view of the description of the ultrasound application step, this is one of the steps that also contributes, in combination with the volume limiting screen application step, with the process parameters and steps described below, to the differential of invention in the context of accelerating and optimizing the aluminum dissolution step.

In the case of an aluminum selective dissolution reaction, it is exothermic, that is, it releases heat and, consequently, increases the temperature. In the context of step (h) and considering grinded laminate polymeric packages comprising aluminum as an aluminum foil, the temperature is adjusted to values between 35 and 90° C., preferably between 75 and 85° C. In the case of grinded laminate polymeric packages comprising aluminum as an aluminum-based metallization layer, the temperature is adjusted to values between 35 and 95° C., preferably between 75 and 90° C. Laminate polymeric packages comprising aluminum as an aluminum-based metallization layer have a low amount of aluminum and, therefore, when subjected to said reaction, they release less heat when compared to laminate polymeric packages comprising aluminum as an aluminum foil. Consequently, the temperature range used in the temperature adjust for grinded laminate polymeric packages comprising aluminum as an aluminum foil has lower values, also for cooling purposes. In view of the temperature adjustment description, this consists of a process parameter that also contributes, in combination with the steps of applying volume limiting screen and applying ultrasound, and with the process parameters and steps described below, for the differential of the invention in the context of accelerating and optimizing the aluminum dissolution step.

Once selected as described in the previous steps, the selected process parameters for vacuum (when used), stirring (when used), ultrasound (when used) and temperature are maintained in step (i) for the purpose of performing the aluminum selective dissolution reaction present in the grinded laminate polymeric packages. Still in relation to step (i), the process parameters are monitored in order to maintain stability at the selected values during the reaction, which proceeds until the aluminum is completely dissolved. The complete aluminum selective dissolution is verified by observing the physical aspect of said packages and by stopping the release of gases in the reactor. Considering the various embodiments covered by the present invention, resulting from the variation of all process parameters, in all their combinations, as well as the numerous possibilities provided for in the ranges of variation of quantities of laminate polymeric packages comprising aluminum and aqueous alkaline solution, the selective dissolution time of aluminum is between 30 minutes and 6 hours. Said time range is one of the main differentials of the invention, being fast and efficient in the face of the long times of selective dissolution of aluminum in prior art recycling processes. The brevity and efficiency of this step is due to the combination of the described process parameters and the highlighted differential steps. In this context, the temperature adjustment, the application of the volume limiting screen and applying ultrasound are the ones having the greatest technical effects in the fast and efficient selective dissolution of aluminum in step (i). Consequently, said aluminum is completely dissolved, providing greater purity to the polyethylene, polypropylene and, when applicable, polyethylene terephthalate fragments formed in step (i). The greater purity of said fragments, consequently, directly affects the purity of the final products obtained according to the process described herein and, therefore, step (i), as conceived, is one of the differentials of the present invention in the context of the purity of said final products.

Still in relation to step (i) and from the reactional point of view, the aluminum selective dissolution occurs so that the alkaline solution digests said aluminum, through the possible chemical equations described below. Said equations are exemplified here through the chemical reaction between an aqueous alkaline solution of sodium hydroxide (NaOH) and aluminum (Al), in its form of aluminum-based metallization layer or as an aluminum foil, with only a few examples among the numerous non-restrictive possibilities for the use of aqueous alkaline solutions and aluminum, according to the scope described above:

equation 1

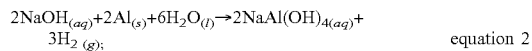

equation 2

In equation 1, sodium hydroxide in the presence of water digests metallic aluminum to form aqueous sodium aluminate $NaAlO_2$ and hydrogen gas $H_2$. Another possible reaction of sodium hydroxide with aluminum in the presence of water is represented by equation 2, wherein sodium tetrahydroxyl aluminate $NaAl(OH)_4$ is formed. Both reactions represented by equations 1 and 2 occur in parallel and are irreversible, that is, they occur only in the direction of product formation. The irreversibility of these reactions is represented by the arrow "→". At the end of the complete aluminum selective dissolution reaction, regardless of whether the aluminum is as an aluminum-based metallization layer or as an aluminum foil, the reactor will comprise a second solution. This comprises aluminum salts, resulting from the selective dissolution of said aluminum, soluble in the second solution; excess of aqueous alkaline solution that can be reused in the process; polyethylene and polypropylene fragments; and when the grinded laminate polymeric packages comprise polyethylene terephthalate, the second solution also comprises polyethylene terephthalate fragments.

Still in relation to step (i) and considering the aforementioned chemical reactions, ultrasound, when used, accelerates the process by separating the polymeric layers, removing from the solution the gases generated in the selective dissolution, preferably hydrogen gas, and increasing the collision rate at the molecular level between the aqueous alkaline solution and aluminum in the context of their dissolution. With the removal of hydrogen by ultrasound, the H2 molecules in equations 1 and 2 are eliminated, decreasing the concentration of this product. Consequently, and following the Le Chatelier perturbation principle, the decrease in the concentration of the products ($H_2$) induces the reaction of the reactants (NaOH, Al and $H_2O$) towards the formation of more products ($H_2$), optimizing the yield of the selective dissolution process.

In step (j) the second solution is drained from the reactor through the bottom of the vessel, being stored in a tank for later reuse in the process. After said drainage, the polyethylene, polypropylene and, when applicable, polyethylene terephthalate fragments are retained at the bottom of the reactor. This is because, at the bottom of said reactor, there is a perforated plate that allows the passage of the second drained solution through the bottom of the reactor, and the retention of said fragments by said perforated plate. The retained fragments have traces of the second solution on their surface, requiring further cleaning. Alternatively, the second solution can be kept in the reactor and the polyethylene, polypropylene and, when applicable, polyethylene terephthalate fragments can be removed, using an endless screw system, wherein said fragments are removed with no need for reactor drainage. For these cases, the endless screw system comprises a screw collector at the bottom of the reactor and another screw collector on the surface of said reactor, with the purpose of complete removal of said fragments with no need to drain the second solution. In this alternative case, the removed fragments also have traces of the second solution on their surface, requiring further cleaning.

Therefore, the polyethylene, polypropylene and, when applicable, polyethylene terephthalate fragments are removed from the reactor and subjected to a cleaning step, as provided for in step (k) of the process described herein, object of the present invention. Said cleaning comprises removing traces of the second solution present on the surface. In this context, the fragments are suspended over an opening screen ranging from 250 microns to 0.1 cm for gravity flow for complete flow of the second solution adhered to the surfaces. Alternatively, the removal of second solution traces on the surface of the fragments is performed by pressing or centrifuging. The second solution removed according to step (k) will also be stored in the same tank where the second solution is stored as described in step (j), also for reuse purposes. In the interval between batches, the salts from the aluminum selective dissolution, present in the second solution stored according to steps (j) or (k), precipitate due to saturation, forming a sludge that can be collected and sent for treatment or used in the production of metallic aluminum due to the high concentration of solid aluminum precipitated preferentially as aluminum hydroxide, however not being limited to this type of solid. In order to accelerate the availability for the next loads, the second solution present in the tank can alternatively be submitted to a filtration process instead of waiting for sedimentation. Thus, the second solution will be reused as many times as possible, always with replacement of the strong base comprised in said aqueous alkaline solution, within the scope of the present invention. The replacement of the strong base occurs in order to restore the aqueous alkaline solution, under the same concentration conditions and amounts foreseen in step (e) for the selective dissolution of aluminum in new batches.

The mechanical disaggregation described in step (I) of the process described herein is applied in order to completely separate the polymeric layers from the fragments obtained in step (k), not completely separated in the previous steps. Said mechanical disintegration is important for the purposes of the present invention, since adhesives and paints are used in the production processes of laminate polymeric packages comprising aluminum. The presence itself of the aforementioned adhesives and paints allows adhesions between polymeric layers separated in the previous steps, being re-aggregated. Thus, a mechanical disaggregation step is necessary for the complete separation of the polymeric layers. For this, the use of equipment turbine-type, cellulose re-pulper, high torque disperser, high shear disperser, among others, with high torque, are examples of embodiments of the present invention applied for the complete disaggregation of the polymeric layers eventually aggregated, obtaining fragments disaggregated. Step (I) takes place wet, in order to remove adhesive impurities and paints frequently present in laminate polymeric packages comprising aluminum. Consequently, the purity of the fragments disaggregated at the end of this step is increased and the decontamination foreseen in step (m) occurs more effectively. In view of the description of the mechanical disaggregation step, this is one of the steps that also contributes, in combination with the aluminum selective dissolution step and with the subsequent steps described below, to the differential of the invention in the context of providing high purity to the final products obtained according to the process described herein.

After mechanical disaggregation, the disaggregated fragments will be decontaminated as provided for in step (m) of the process described herein, object of the present invention. The decontamination of this step occurs through the use of immersion water or a water curtain system. In this context, decontamination occurs successively until the pH of the rinse solution comprises values between 4 and 7, in addition to the crystalline aspect of the solution. Preferably, the rinsing is performed in a closed tank with recirculation and that allows the eventual correction of the pH with hydrochloric acid. Validation of complete decontamination will be done visually. In this context, the disaggregated fragments will be validated as clean fragments after the visualization of absence of colors or aqueous particles present on the surface of said fragments. Additionally, a pH control can be previously performed on the water involved in the decontamination of the disaggregated fragments. In this case, the pH of the water is adjusted to values in the range between 4.0 and 7.0 through the use of dilute hydrochloric acid (HCl), thus ensuring the complete consumption of any residual strong base in the disaggregated fragments. Upon completion of the decontamination, clean fragments based on polyethylene, polypropylene and, when applicable, polyethylene terephthalate will be obtained. When the cleaned fragments comprise polyethylene terephthalate, they will be destined for step (n) for gravity separation in a tank comprising water. If said clean fragments do not comprise polyethylene terephthalate, gravitational separation, for the reasons explained below, will not be necessary and, therefore, they will be directly transferred to the drying process described in step (o).

When the clean fragments comprise polyethylene terephthalate, especially mixed with polyethylene and polypropylene, the gravitational separation step is necessary as it allows separating the polyethylene terephthalate, which is denser than water, from the polyethylene and polypropylene, which is less dense than water. Thus, the gravitational separation takes place in a tank comprising water in order to allow this type of separation, as provided for in step (n) of the process described herein. In this way, when the clean fragments are added to the water present in said tank, the polyethylene terephthalate will precipitate at the bottom of the tank, as it comprises a density between 1.30 and 1.45 g/cm$^3$, while the water comprises a density between 0.985 and 1.0 g/cm$^3$ at temperatures between 5 and 60° C. Similarly, in the context of density differences, polyethylene and polypropylene are suspended in the water supernatant, as they comprise a density between 0.91 and 0.95 g/cm$^3$. Therefore, clean polyethylene and polypropylene-based fragments, properly separated from polyethylene terephthalate, are obtained by removing them from the water supernatant using a polyethylene and polypropylene-based clean fragment removal means. In a preferred and non-limited embodiment of the present invention, the polyethylene and polypropylene-based clean fragment removal means comprise the use of the endless screw system. For these cases, the endless screw system comprises an endless screw collector on the surface of the tank, with the purpose of complete removal of said fragments present in the supernatant. The clean fragments based on polyethylene terephthalate, properly separated from polyethylene and polypropylene, in turn, are obtained by removing them from the bottom of the tank through means of removing the clean fragments based on polyethylene terephthalate. In a preferred and non-limited embodiment of the present invention, the means of removing the clean fragments based on polyethylene terephthalate comprises the use of the endless screw system. For these cases, the endless screw system comprises an endless screw collector at the bottom of the tank, with the purpose of complete removal of said fragments present at the bottom of the tank. Finally, the cleaned polyethylene and polypropylene-based fragments obtained in step (n) are transferred to the drying process described in step (o). Sequentially, the cleaned polyethylene terephthalate-based fragments are also transferred to said drying step (o). In view of the description of the gravitational separation step, this consists of one of the steps that also contributes, in combination with the step of aluminum selective dissolution and mechanical disaggregation, and with the later steps described below, to the differential of the invention in the context of providing high purity to the final products obtained according to the process described herein, specifically when it covers the recycling of laminate polymeric packages comprising aluminum in which polyethylene terephthalate is present.

In step (o) drying occurs for the clean fragments obtained according to step (m) or according to step (n). The cleaned fragments based on polyethylene terephthalate, when applicable, will be individually dried after drying the cleaned fragments based on polyethylene and polypropylene. The drying of said clean fragments takes place in equipment comprising means for pressing, centrifugation and applying cyclone techniques, with or without hot air, commercially available and efficient in the scope of moisture removal. These equipment are frequently used in washing lines for post-consumer plastics, such as post-consumer laminate polymeric packages, due to the step of washing food and dirt present. Drying allows better efficiency of the pelletizing step (if optionally applied), since the water evaporates at a temperature significantly different from the processing temperatures involved in pelletizing. Finally, after drying the clean fragments involved in step (o), recycled fragments based on polyethylene and polypropylene are obtained. When applicable, recycled fragments based on polyethylene terephthalate are also individually obtained after drying.

With recycled fragments obtained in a high degree of purity, especially up to 99% purity, increased added value and quality can be achieved through an optional (p) pelleting step. In this step, a recycled fragments recycling system is used, which makes the individual pelletizing of said recycled fragments. Commercial recycling systems are, in some cases, equipped with special filters that help to remove any undesirable material (contamination) eventually added to the recycled fragments and that may affect the formation of films, or the appearance of the pelletized fragments obtained after the pelletizing step (p). Consequently, the pelleted fragments are obtained with higher quality and greater scope of use, being also considered final products obtained according to the process described herein. In view of the description of the pelleting step, this consists in of the steps that also contributes, in combination with the aluminum selective dissolution step, mechanical disaggregation and gravitational separation (when applicable), to the differential of the invention in terms of context of providing high purity to the final products obtained according to the process described herein. In this context, the pelleted fragments are obtained with up to 100% purity—the efficiency in the degree of purity depends on the quality and purity of the inputs used in the manufacture of laminate polymeric packages.

As described, the set of process parameters and steps, when considered in combination in the process described herein, consist in differential of the present invention from the point of view of time decrease and process optimization and from the perspective of high purity of the final products. In this set, the following are mainly mentioned: temperature adjustment, applying volume limiting screen, applying ultrasound (when performed), mechanical disaggregation, aluminum selective dissolution, gravitational separation (when performed) and pelleting (when performed). performed), as characteristics allowing the invention to solve the prior art problems. The prior art technologies do not comprise such characteristics and do not allow obtaining final products with high purity, as described, and optimized process performed in a reduced time, as described.

The present invention also shows as a differential the fact that it does not generate waste harmful to the environment, since the products generated are: polyethylene, polypropylene and polyethylene terephthalate (when applicable), of industrial and commercial interest; solid aluminum, preferably as aluminum hydroxide, of industrial and commercial interest; excess aqueous alkaline solution returned to the process; and fuel gases, preferably hydrogen gas, also of industrial and commercial interest.

EXAMPLES

The examples of embodiment described herein are intended to demonstrate some of the numerous ways in which the present invention can be conceived, not being limited to the ways of design exemplified below.

Table 1 shows the influence of temperature on the time of aluminum selective dissolution, as described in step (i) of the recycling process of laminate polymeric packages, object of the present invention. As laminate polymeric packages, we have in this example the packages PET-m-PE (comprising aluminum as an aluminum-based metallization) and PET-ALU-PE (comprising aluminum as an aluminum foil).

TABLE 1 influence of temperature on the complete aluminum dissolution time in PET-m-PE and PET-ALU-PE packages.

|  | PET-m-PE<br>0.4 × 0.4 cm | PET-ALU-PE<br>0.35 × 0.35 cm |
|---|---|---|
| 20° C. | 5 hours | 4.5 hours |
| 95° C. | 10 minutes | 25 minutes |

According to table 1, the complete dissolution time of aluminum at 20° C. for laminate polymeric packages based on PET-m-PE comprising dimensions of 0.4×0.4 cm and for laminate polymeric packages based on PET-ALU-PE comprising dimensions of 0.35×0.35 cm, occurs for 5 and 4.5 hours, respectively. Increasing to 95° C., the dissolution time is reduced to 10 and 25 minutes, in that order. The increase in temperature in this case promotes an increase in the collision rate at the molecular level in the step, accelerating the dissolution time. Based on the results shown in table 1, the packaging contained aluminum (foil or ALU) while the other only metallization (m). In this sense, the time varied as a function of the characteristic of the polymeric packaging subjected to selective dissolution.

Tables 2 to 6 below refer to the influence of the following process variables, respectively, on the aluminum selective dissolution time, as described in step (i) of the process described herein, in PET-ALU-PE-based laminate polymeric packages: concentration of aqueous alkaline solution; dimensions of laminate polymeric packages; temperature; ultrasound; and agitation.

TABLE 2

Influence of NaOH-based aqueous alkaline solution concentration on aluminum complete dissolution time in PET-ALU-PE packages.
Process variable: concentration of NaOH-based aqueous alkaline solution

| Concentration<br>(mass/volume) | Temperature<br>(° C.) | Time<br>(min) | Stirring | Size<br>(cm) | Ultrasound |
|---|---|---|---|---|---|
| 1% | 75 | 660 | No | 0.5 × 0.5 | No |
| 2.50% | 75 | 125 | No | 0.5 × 0.5 | No |
| 5.00% | 75 | 15 | No | 0.5 × 0.5 | No |
| 10.00% | 75 | 5 | No | 0.5 × 0.5 | No |

According to table 2, increasing the concentration of aqueous alkaline solution decreases the dissolution time of aluminum in PET-ALU-PE-based laminate polymeric packages.

TABLE 3

Influence of the dimensions of laminate polymeric packages on the time of complete dissolution of aluminum in PET-ALU-PE packages.
Process variable: dimensions of PET-ALU-PE laminate polymeric packages

| Concentration<br>(mass/volume) | Temperature<br>(° C.) | Time<br>(min) | Stirring | Size<br>(cm) | Ultrasound |
|---|---|---|---|---|---|
| 2.50% | 75 | 106 | No | 0.5 × 0.5 | No |
| 2.50% | 75 | 206 | No | 1 × 1 | No |
| 2.50% | 75 | 456 | No | 2 × 2 | No |

According to table 3, decreasing the size of PET-ALU-PE-based laminate polymeric packages reduces the aluminum dissolution time.

TABLE 4 influence of temperature on the time of complete dissolution of aluminum in PET-ALU-PE packages.
Process variable: temperature

| Concentration<br>(mass/volume) | Temperature<br>(° C.) | Time<br>(min) | Stirring | Size<br>(cm) | Ultrasound |
|---|---|---|---|---|---|
| 5% | 25 | 287 | No | 0.5 × 0.5 | No |
| 5% | 75 | 17 | No | 0.5 × 0.5 | No |

According to table 4, the increase in temperature decreases the aluminum dissolution time in PET-ALU-PE-based laminate polymeric packages.

TABLE 5

Influence of ultrasound on the complete aluminum
dissolution time in PET-ALU-PE packages.
Process variable: ultrasound

| Concentration (mass/volume) | Temperature (° C.) | Time (min) | Stirring | Size (cm) | Ultrasound |
|---|---|---|---|---|---|
| 5% | 25 | 287 | No | 0.5 × 0.5 | No |
| 5% | 25 | 135 | No | 0.5 × 0.5 | Yes |

According to table 5, applying ultrasound reduces the aluminum dissolution time in PET-ALU-PE-based laminate polymeric packages.

TABLE 6

Influence of stirring on the complete aluminum
dissolution time in PET-ALU-PE packages.
Process variable: stirring (ON/OFF)

| Concentration (mass/volume) | Temperature (° C.) | Time (min) | Stirring | Size (cm) | Ultrasound |
|---|---|---|---|---|---|
| 5% | 25 | 287 | No | 0.5 × 0.5 | No |
| 5% | 25 | 255 | Yes | 0.5 × 0.5 | No |

According to table 6, applying stirring in the aluminum dissolution step reduces the aluminum dissolution time in PET-ALU-PE-based polymeric laminate packages.

It should be understood the present description does not limit application to the details described herein and the invention is capable of other embodiments and of being practiced or performed in several ways, within the scope of the claims. Although specific terms have been used, such terms should be interpreted in a generic and descriptive sense and not for the purpose of limitation.

The invention claimed is:

1. A process for recycling laminated polymer packaging comprising aluminum, said packages comprising a plurality of polymeric layers comprising polyethylene and polypropylene, characterized in that it comprises the following steps:
   (a) crushing in a wet or dry fashion and preliminary washing of the laminate polymeric packages comprising aluminum, forming crushed laminate polymeric packages in the form of particles and/or fragments with dimensions between 50 microns and 5 cm;
   (b) transferring the crushed laminate polymeric packages to a reactor, in which the amount of aluminum present in said crushed laminate polymeric packaging comprises is from 0.01% to up 40% of the total mass of packaging present in the reactor;
   (c) applying a volume limiting screen to the reactor, positioned at the top of the reactor, in the alkaline solution and above the volume filled by the crushed laminated polymer packaging, wherein said volume limiting barrier comprises openings of up to 01 cm;
   (e) immersing said crushed laminate polymeric packages into an aqueous alkaline solution, forming a first solution, wherein the aqueous alkaline solution comprises a strong base at concentrations between 1 and 50% by mass/volume, wherein the amount of strong base comprises the range between 1.0 and 5.0 kg for each kg of aluminum present in the reactor;
   (h) temperature adjustment of the first solution to values between 35 and 90° C., when the crushed laminate polymeric packages comprise aluminum as an aluminum foil; or said temperature is adjusted o values between 35 and 95° C., when the crushed laminate polymeric packages comprise aluminum as a metallization layer,
   (i) aluminum selective dissolution reaction in the first solution, between 30 minutes and 6 hours, forming a second solution comprising polyethylene and polypropylene fragments;
   (j) draining the second solution from the reactor, so that the fragments from step (i) are retained at the bottom of the reactor;
   (k) removing the fragments from the reactor and cleaning said fragments;
   (l) mechanical disaggregation of the fragments of step (k), forming disaggregated fragments;
   (m) decontamination of the disaggregated fragments, obtaining clean fragments based on polyethylene and polypropylene, transferring said cleaned fragments directly to the subsequent step (o); and
   (o) drying the clean fragments obtained according to step (m), obtaining recycled fragments of polyethylene and polypropylene.

2. The process, according to claim 1, characterized in that it additionally comprises the independently optional steps and in the detailed order:
   (d) applying a vacuum comprises pressure values between 100 and 630 mmHg to the reactor for the purpose of suctioning balls and gases generated in the selective dissolution stage of aluminum, in which the vacuum is applied in a range between 100 and 630 mmHg; and/or
   (f) stirring the first solution, for preliminary mechanical disintegration of the crushed packaging, at a rotation range between 10 and 500 RPM; and/or
   (g) applying ultrasound to the first solution with the aim of accelerating the movement of molecules and releasing the gases generated, reducing the process time; and/or
   (p) pelletizing said recycled fragments.

3. The process, according to claim 1, characterized in that the crushed laminate polymeric packages comprising aluminum are present in amounts of up to 80% of the volumetric capacity of the reactor.

4. The process, according to claim 1, characterized in that the crushing and washing in step (a) are performed through devices selected from the group that comprises chippers, shredders, cutting mills, mills rotary and plastic sprayers.

5. The process, according to claim 1, characterized in that the strong base is selected from the group comprising alkali-metal hydroxides and alkaline-earth metal hydroxides and the alkali-metal hydroxides are selected from the group comprising lithium hydroxide (LiOH), sodium hydroxide (NaOH) and potassium hydroxide (KOH) and the alkaline earth metal hydroxides are selected from the group comprising calcium hydroxide $Ca(OH)_2$, magnesium hydroxide $Mg(OH)_2$ and barium hydroxide $Ba(OH)_2$.

6. The process, according to claim 1, characterized in that the fragments of step (k) are cleaned by pressing, centrifuging or suspending said fragments on an opening screen of size varying between 250 microns and 0.1 cm.

7. The process, according claim 1, characterized in that the mechanical disaggregation is performed wet and through equipment selected from the group comprising turbine, cellulose re-pulper, high torque disperser and high shear disperser, wherein the decontamination is performed through the use of immersion water or a water-curtain system, with the water comprising a pH between 4.0 and 7.0 and the drying of clean fragments is performed in equipment comprising means for press, centrifugation and for applications of cyclone techniques, with or without hot air.

8. A process for recycling laminated polymer packaging comprising aluminum, said packages comprising a plurality of polymeric layers comprising polyethylene, polypropylene and polyethylene terephthalate, characterized in that it comprises the following steps:
(a) crushing in a wet or dry fashion and preliminary washing of the laminate polymeric packages comprising aluminum, forming crushed laminate polymeric packages in the form of particles and/or fragments with dimensions between 50 microns and 5 cm;
(b) transferring the crushed laminate polymeric packages to a reactor, in which the amount of aluminum present in said crushed laminate polymeric packaging comprises is from 0.01% to up 40% of the total mass of packaging present in the reactor;
(c) applying of a volume limiting screen to the reactor, positioned at the top of the reactor, in the alkaline solution and above the volume filled by the crushed laminated polymer packaging, wherein said volume limiting barrier comprises openings of up to 01 cm;
(e) immersing said crushed laminate polymeric packages in an aqueous alkaline solution, forming a first solution, wherein the aqueous alkaline solution comprises a strong base at concentrations between 1 and 50% by mass/volume, wherein the amount of strong base comprises the range between 1.0 and 5.0 kg for each kg of aluminum present in the reactor;
(h) temperature adjustment of the first solution to values between 35 and 90° C., when the crushed laminate polymeric packages comprise aluminum as an aluminum foil; or said temperature is adjusted o values between 35 and 95° C., when the crushed laminate polymeric packages comprise aluminum as a metallization layer;
(i) selective dissolution reaction of aluminum in the first solution, between 30 minutes and 6 hours, forming a second solution comprising polyethylene, polypropylene and polyethylene terephthalate fragments;
(j) draining the second solution from the reactor, so that the fragments from step (i) are retained at the bottom of the reactor;
(k) removing the fragments from the reactor and cleaning said fragments;
(l) mechanical disaggregation of the fragments of step (k), forming disaggregated fragments;
(m) decontamination of the disaggregated fragments, obtaining clean fragments based on polyethylene, polypropylene and polyethylene terephthalate, and transferring said clean fragments to a water tank for gravitational separation in the subsequent step (n);
(n) gravitational separation of the cleaned fragments comprising polyethylene, polypropylene and polyethylene terephthalate, in the water tank; obtaining polyethylene and polypropylene fragments in the supernatant and polyethylene terephthalate at the bottom of the tank; removing and obtaining clean polyethylene and polypropylene fragments; removing and obtaining clean polyethylene terephthalate fragments; transferring the cleaned polyethylene and polypropylene fragments to the subsequent step (o); and transferring the cleaned polyethylene terephthalate fragments to the subsequent step (o); and
(o) drying the clean fragments obtained according to step (n), obtaining recycled fragments of polyethylene, polypropylene and polyethylene terephthalate.

9. The process, according to claim 8, characterized in that it additionally comprises the independently optional steps and in the detailed order:
(d) applying a vacuum for the purpose of suctioning balls and gases generated in the selective dissolution stage of aluminum, in which the comprises pressure values between 100 and 630 mmHg to the reactor; and/or
(f) stirring the first solution, for preliminary mechanical disintegration of the crushed packaging, in a rotation range comprising the interval between 10 and 500 RPM; and/or
(g) applying ultrasound to the first solution with the aim of accelerating the movement of molecules and releasing the gases generated, reducing the process time; and/or
(p) pelletizing said recycled fragments.

10. The process, according to claim 8, characterized in that the laminate polymeric packages comprising aluminum are present in amounts of up to 80% of the reactor volumetric capacity.

11. The process, according to claim 8, characterized in that the crushing and washing in step (a) are performed through devices selected from the group that comprises chippers, shredders, cutting mills, rotary mills and plastic sprayers.

12. The process, according to claim 8, characterized in that the strong base is selected from the group comprising alkali-metal hydroxides and alkaline-earth metal hydroxides and the alkali-metal hydroxides are selected from the group comprising lithium hydroxide (LiOH), sodium hydroxide (NaOH) and potassium hydroxide (KOH) and the alkaline-earth metal hydroxides are selected from the group comprising calcium hydroxide $Ca(OH)_2$, magnesium hydroxide $Mg(OH)_2$ and barium hydroxide $Ba(OH)_2$.

13. The process, according to claim 8, characterized in that the fragments of step (k) are cleaned by pressing, centrifuging or suspending said fragments on an opening screen of size varying between 250 micron and 0.1 cm.

14. The process, according to claim 8, characterized in that the mechanical disaggregation is performed wet and through equipment selected from the group comprising turbine, cellulose re-pulper, high torque disperser and high shear disperser, wherein the decontamination is performed through the use of immersion water or a water-curtain system, with the water comprising a pH between 4.0 and 7.0, wherein in the gravitational separation the clean fragments of polyethylene and polypropylene are removed and obtained by means of an endless screw collector on the surface of the tank; and the clean polyethylene terephthalate fragments are removed and obtained by means of an endless screw collector at the bottom of the tank and drying of clean fragments is performed in equipment comprising means for press, centrifugation and for applications of cyclone techniques, with or without hot air.

15. The process, according to claim 1, characterized by the fact that the vacuum applied comprises pressure values, preferably between 400 and 500 mmHg.

16. The process, according to claim 1, characterized in that the grinding in step (a) is performed wet or dry.

17. The process, according to claim 1, characterized in that the volume limiting screen is selected from the group comprising perforated sheet, a metal screen or a plastic screen.

18. The process, according to claim 1, characterized in that the reactor comprises a volume between 100L and 50,000L.

19. The process, according to claim 8, the grinding in step (a) is performed wet or dry.

20. The process, according to claim 8, characterized in that the volume limiting screen is selected from the group comprising perforated sheet, a metal screen or a plastic screen.

\* \* \* \* \*